(12) United States Patent
Blagov et al.

(10) Patent No.: US 9,891,022 B2
(45) Date of Patent: Feb. 13, 2018

(54) OPTICAL SIGHT

(71) Applicant: RusOpticalSystem LTD, Sergiev Posad, Moscow Region (RU)

(72) Inventors: Pavel Andreevich Blagov, Sergiev Posad (RU); Evgeny Viktorovich Tsivilev, Sergiev Posad (RU)

(73) Assignee: RusOpticalSystem LTD, Sergiev Posad Moscow Region (RU)

( * ) Notice: Subject to any disclaimer, the term of this patent is extended or adjusted under 35 U.S.C. 154(b) by 0 days.

(21) Appl. No.: 14/896,655

(22) PCT Filed: Apr. 1, 2014

(86) PCT No.: PCT/RU2014/000235
§ 371 (c)(1),
(2) Date: Dec. 7, 2015

(87) PCT Pub. No.: WO2014/196897
PCT Pub. Date: Dec. 11, 2014

(65) Prior Publication Data
US 2016/0138889 A1    May 19, 2016

(30) Foreign Application Priority Data

Jun. 6, 2013 (RU) ................................ 2013126080

(51) Int. Cl.
*F41G 1/38* (2006.01)
*G02B 17/08* (2006.01)
(Continued)

(52) U.S. Cl.
CPC ............... *F41G 1/38* (2013.01); *G02B 17/08* (2013.01); *G02B 23/02* (2013.01); *G02B 23/10* (2013.01); *G02B 27/32* (2013.01)

(58) Field of Classification Search
CPC ........... F41G 1/38; G02B 17/08; G02B 23/02; G02B 23/10; G02B 27/32
(Continued)

(56) References Cited

U.S. PATENT DOCUMENTS 4,483,598 A * 11/1984 Leightner ............... G02B 23/10
356/144
5,061,054 A * 10/1991 Ohshita ..................... G02B 5/04
359/376

(Continued)

FOREIGN PATENT DOCUMENTS

DE       10010443 A1    9/2000
FR        2382708 A1    9/1978
(Continued)

OTHER PUBLICATIONS

International Search Report from PCT/RU2014/000235 dated Apr. 1, 2014, dated Aug. 21, 2014.

*Primary Examiner* — Bumsuk Won
*Assistant Examiner* — Grant Gagnon
(74) *Attorney, Agent, or Firm* — Patentbar International, P.C.

(57) ABSTRACT

The invention relates to an optical-instrument making industry, namely, to optical sights used for small arms shooting. The technical result, which the claimed invention is intended to achieve, is a simpler design while maintaining functional capabilities and, correspondingly, increased reliability and a decreased cost of the product overall.

Said technical result is achieved in that the optical sight includes a common eyepiece and two optical channels which are arranged in parallel and which have different magnification, each of which contains, arranged along the path of rays, an objective, reticles and an erecting system; the common eyepiece is provided on the axis of the lower-magnification channel, the objectives of both channels have (Continued)

equal focal lengths, reticles are provided in the common focal plane of the channels, the higher-magnification channel is additionally provided with an optical element which is positioned in front of the focal plane and which is capable of shifting the axis of the higher-magnification optical channel.

5 Claims, 6 Drawing Sheets

(51) Int. Cl.
*G02B 27/32* (2006.01)
*G02B 23/02* (2006.01)
*G02B 23/10* (2006.01)

(58) Field of Classification Search
USPC .......................................................... 359/420
See application file for complete search history.

(56) References Cited

U.S. PATENT DOCUMENTS

| 9,279,975 | B2* | 3/2016 | Berlips | ..................... F41G 1/38 |
| 2011/0128620 | A1* | 6/2011 | Denis | ..................... G02B 23/04 |
| | | | | 359/420 |
| 2013/0308182 | A1* | 11/2013 | Blagov | ................... F41G 1/345 |
| | | | | 359/428 |

FOREIGN PATENT DOCUMENTS

| RU | 2157556 C1 | 10/2000 |
| RU | 2335791 C1 | 10/2008 |
| RU | 2364899 C1 | 8/2009 |
| SU | 321679 | 11/1971 |

* cited by examiner

OPTICAL SIGHT

TECHNICAL FIELD

The invention relates to an optical-instrument making industry, hence, to optical sights used for small arms shooting.

DESCRIPTION OF THE PRIOR ART

Known from the prior art are various designs of optical sights disclosed, for example, in FR patent No. 2382708 published on 29 Sep. 1978, RU patent No. 2157556 published on 10 Oct. 2000 and so on.

The main disadvantage of the known technical decisions is a poor convenience of use due to absence of the possibility to provide the user with a small and large target image simultaneously and jointly.

The closest to the claimed invention on the basis of essential features is an optical sight accord to RU patent No. 2364899 published on 20 Aug. 2009 comprising, arranged in series, an objective, a reticle, a two-component erecting system.

This sight permits to survey a large field of view with low magnification and a central part of field of view in more detail with high magnification but this functional capability is realized by means of a rather complicated design solution causing a high cost product overall and low reliability.

DISCLOSURE OF THE INVENTION

The technical result, which the claimed invention is intended to achieve, is a simpler design while maintaining functional capabilities and, correspondingly, increased reliability and a decreased cost of the product overall.

Said technical result is achieved in that the optical sight includes a common eyepiece and two optical channels which are arranged in parallel and have different magnifications, each of which comprises, arranged along the path of rays, an objective, reticles and an erecting system; the common eyepiece is arranged on the axis of the lower-magnification channel, the objectives of both channels have equal focal lengths, the reticles are provided in the common focal plane of the channels, and the higher-magnification channel is additionally provided with an optical element which is positioned in front of the focal plane and which is capable of shifting the axis of the higher-magnification optical channel.

The optical element positioned in front of the focal plane of the eyepiece serves for moving the image of target and reticle of higher-magnification channel toward the edge of the field of view of the eyepiece near the image of target and reticle of the lower-magnification channel.

The presence of the optical element in the design allows simultaneous observation of images of both channels, simultaneous use of aiming reticles of both channels, and as a result, the user (shooter) can observe and use for aiming and shooting both channels at the same time without making any changes in the optical device.

In this case the optical element can be made as a prism-rhomb with two reflections; or as two rectangular prisms arranged one under the other so that their reflective faces are parallel to each other; or as two plane inclined mirrors; or as two wedges, hypotenuse faces of which facing each other and positioned parallel to each other and offset relative to each other in the plane perpendicular to the channel axis so that the base of the first along the path of rays wedge is arranged above the vertex of the second along the path of rays wedge.

The present design of the optical sight ensures simultaneous observation of the target and surrounding terrain with two magnifications. In this case the hunter sees a larger part of the terrain with lower magnification and a central part of this terrain with higher magnification at one and the same time.

BRIEF DESCRIPTION OF THE DRAWINGS

The essence of the invention is explained by the drawings, where.

EMBODIMENT OF THE INVENTION

Figure 1:
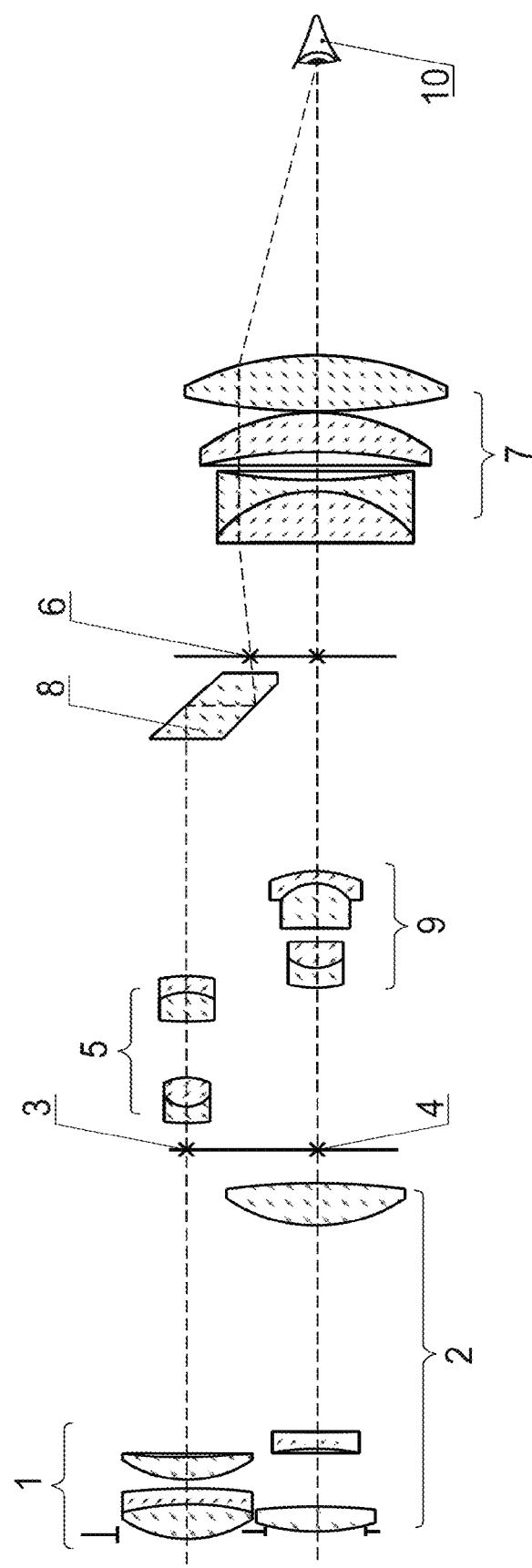
FIG. 1 is a general view of the sight.
Figure 2:
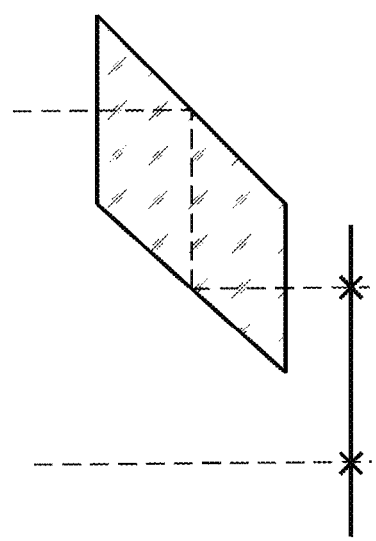
FIG. 2 illustrates an optical element made as a prism-rhomb with two reflections.
Figure 3:
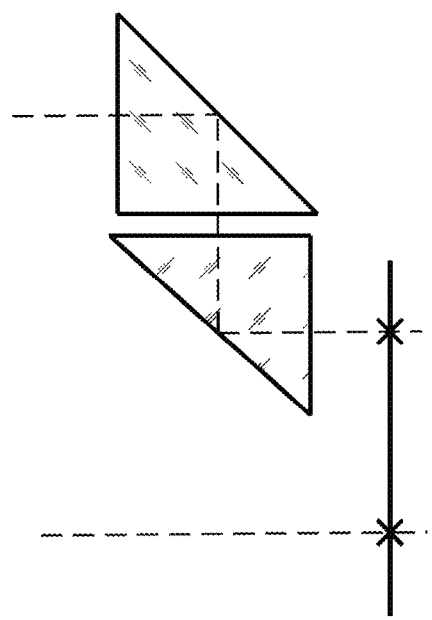
FIG. 3 illustrates an optical element made as two rectangular prisms positioned one under the other.
Figure 4:
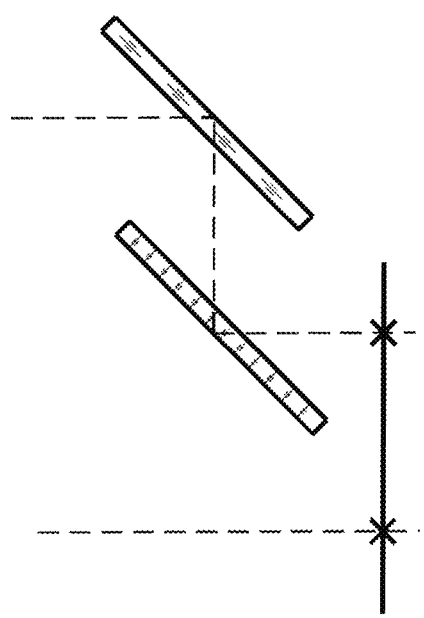
FIG. 4 illustrates an optical element made as two plane inclined mirrors.
Figure 5:
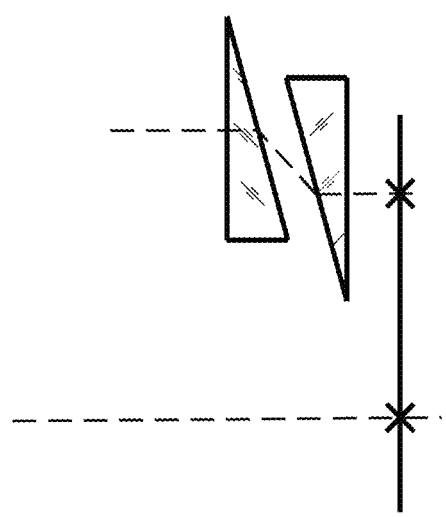
FIG. 5 illustrates an optical element made as two wedges.

The sight operation is explained in FIG. 1 and performed in the following way.

The light rays from the target enter an objective (1) of the higher-magnification channel and, arranged near, an objective (2) of the lower-magnification channel which have equal values of focal lengths. The objective (1) forms a target image in the plane of reticle (3) and the objective (2), in plane of reticle (4), arranged in one plane.

The objective (1) of the higher-magnification channel along the path of rays from the target comprises as a rule, arranged in series, a positive, negative and positive lenses according to the focal length value of the lenses, of which first two lenses are made with the possibility of cementing to each other.

The objective (2) of the lower-magnification channel along the path of rays comprises as a rule, arranged in series, a positive, negative and positive lenses arranged at a some distance to each other so that the third lens relative to the second lens is at a larger distance than the second lens from the first lens.

Further, the erecting system (5) of the higher-magnification channel forms a target image in the focal plane (6) of eyepiece (7), in this case the optical element (8) shifts the optical axis of this channel to the edge of the field of view of eyepiece (7). The erecting system (5) along the path of rays comprises two optical components cemented from a positive and negative lenses facing each other with positive lenses.

The erecting system (9) of the lower-magnification channel transfers the reticle (4) and target image to the focal plane (6) of eyepiece (7). The erecting system (9) along the path of rays comprises two optical components cemented from a positive and negative lenses facing each other with the positive lenses. Here these components of the erecting system (9) are at a larger distance from the reticle (4) than the components of the erecting system (5) of the higher-magnification channel, from the reticle (3).

The eyepiece (7) along the path of rays comprises a positive lens and a double-concave negative lens cemented to each other, a positive meniscus facing with its concavity to the reticle, and a double-convex lens.

Figure 6:
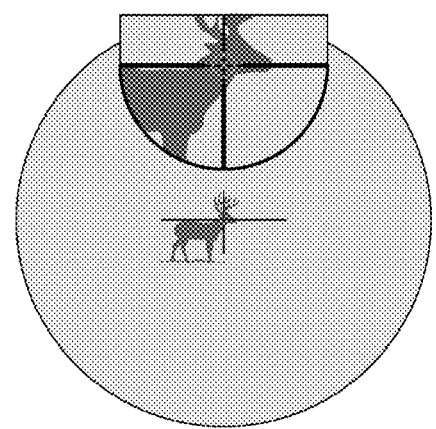
FIG. 6 shows an example of the image on the eyepiece.

The optical element (8) decreases the distance between the axes of both channels through shifting so that the image of both channels is seen simultaneously through the eyepiece to the hunter (the shooter). Thus, with the help of eyepiece (7) the hunter's eye situated in the exit pupil (10) of the eyepiece surveys a terrain and at the same its central part, magnified some times, arranged on the edge of the eyepiece field of view (see FIG. 6).

This is achieved with that the sight includes two optical channels arranged in parallel, along the path of rays each comprising an objective, a reticle, an erecting system and a common eyepiece arranged on one axis of the channel having a lower magnification. In this case the objectives of both channels have equal focal lengths and the focal planes of both objectives are arranged in one plane, in which are the patterns of the aiming reticles. Arranged along the path of rays behind the reticles are erecting systems, one of which arranged in front of the optical element has a higher magnification than the erecting system of the other channel. The optical element arranged in front of the focal plane of the eyepiece serves for shifting the target image of the higher-magnification channel to the edge of eyepiece field of view.

Formed field of view of the sight according to the present invention, in which two images are simultaneously forming, with higher or lower magnification, is the main advantage over pancratic sights when at low magnification is surveyed a large space and at high magnification only its small part, here when changing the magnification toward its increase the target often disappears from the view.

Another advantage of this sight over the existing ones with a combined field of view is a higher transmission coefficient of both channels superior in 2-plus times.

According to the suggested scheme, sight EE 1.5/6×24 has been developed with the characteristics given in Table 1.

TABLE 1

| Channel | Magnification, X | Field of view, deg. | Diameter of entrance pupil, mm | Distance of exit pupil, mm | Length, mm | Transmission coefficient of channel, % |
|---|---|---|---|---|---|---|
| 1 | 1.5 | 16 | 11 | 90 | 120 | 92 |
| 2 | 6 | 1 × 2 | 24 | 90 | 120 | 92 |

The invention claimed is:

1. An optical sight, comprising:

a common eyepiece;

a first optical channel including (i) a first objective having a first fixed magnification and (ii) a first erecting system, wherein optical axes of the first objective and first erecting system coincide and form an optical axis of the first optical channel;

a light-shifting element directing the optical axis of the first optical channel into the common eyepiece; and a second optical channel including (i) a second objective having a second fixed magnification and (ii) a second erecting system, wherein optical axes of the second objective and second erecting system coincide and form an optical axis of the second optical channel;

wherein:

a focal length of the first objective is equal to a focal length of the second objective; and the first fixed magnification is greater than the second fixed magnification.

2. The optical sight according to claim 1, wherein the light-shifting element includes a prism-rhomb having two reflective surfaces.

3. The optical sight according to claim 1, wherein the light-shifting element includes two adjacently disposed rectangular prisms which reflective surfaces are parallel to each other.

4. The optical sight according to claim 1, wherein the light-shifting element includes two adjacently disposed inclined plane mirrors.

5. The optical sight according to claim 1, wherein the light-shifting element includes two adjacently disposed wedges which hypotenuse surfaces (i) oppose and parallel to each other, and (ii) shifted in a pre-selected direction relative to each other in a plane perpendicular to the optical axis of the first optical channel.

* * * * *